(12) United States Patent  (10) Patent No.: US 7,641,421 B2
Roodenburg et al.  (45) Date of Patent: Jan. 5, 2010

(54) OFFSHORE VESSEL

(75) Inventors: Joop Roodenburg, Delft (NL);
Diederick Bernardus Wijning, Schiedam (NL)

(73) Assignee: ITREC, B.V., Schiedam (NL)

( * ) Notice: Subject to any disclaimer, the term of this patent is extended or adjusted under 35 U.S.C. 154(b) by 330 days.

(21) Appl. No.: 11/612,273

(22) Filed: Dec. 18, 2006

(65) Prior Publication Data

US 2007/0098504 A1 May 3, 2007

Related U.S. Application Data

(63) Continuation-in-part of application No. PCT/NL2005/000443, filed on Jun. 17, 2005.

(51) Int. Cl.
*F16L 1/12* (2006.01)
(52) U.S. Cl. .................. 405/166; 405/158; 405/170
(58) Field of Classification Search ............. 405/154.1, 405/158, 165, 166, 167, 169, 170; 414/745.4
See application file for complete search history.

(56) References Cited

U.S. PATENT DOCUMENTS

| 4,187,949 A * | 2/1980 | Komatsu ............. 212/307 |
| 4,200,162 A * | 4/1980 | Tax .................. 180/23 |
| 4,349,115 A * | 9/1982 | Lampson ............ 212/178 |
| 5,011,333 A | 4/1991 | Lanan et al. |
| 5,579,931 A | 12/1996 | Zuehlke et al. |
| 5,580,189 A * | 12/1996 | Sanders et al. ......... 405/198 |
| 6,328,502 B1 * | 12/2001 | Hickey et al. ......... 405/168.3 |
| 7,107,129 B2 * | 9/2006 | Rowe et al. ............ 701/1 |

FOREIGN PATENT DOCUMENTS

| DE | 2642910 A1 | 3/1978 |
| DE | 10016021 A1 | 10/2001 |
| EP | 1063163 A | 12/2000 |
| GB | 2025349 A | 1/1980 |
| NL | 8104269 A | 4/1983 |
| NL | 8503094 A | 6/1987 |

OTHER PUBLICATIONS

The Advantageous Heavy Lift Mass Crane (HLMC), 26, iro journaal 23, Jun. 12, 1987; pp. 26-29.

* cited by examiner

*Primary Examiner*—Tara Mayo-Pinnock
*Assistant Examiner*—Benjamin Fiorello
(74) *Attorney, Agent, or Firm*—Buskop Law Group, PC; Wendy Buskop

(57) ABSTRACT

An offshore vessel suitable for laying a pipeline on the seabed, having a pipeline-laying installation of the S-lay type. The offshore vessel has one or more connecting stations disposed on a working deck. The connecting stations are for connecting pipeline sections in a substantially horizontal orientation. A stinger engages on a first side of a hull secured to offshore vessel at an engagement point and protrudes outside the hull, and forms a downwardly directed support for pipeline moving towards the seabed. A hoisting crane is disposed on the first side of the hull, comprising a substantially hollow vertical column comprising a top, a foot, and a body disposed between the foot and the body.

7 Claims, 13 Drawing Sheets

OFFSHORE VESSEL

CROSS REFERENCE TO RELATED APPLICATIONS

The present application is a continuation-in-part application which claims priority to co-pending International Application Number PCT/NL2005/000443 filed on 17 Jun. 2005 entitled "Hoisting Crane and Offshore Vessel" which claims priority to Netherlands Application Number 1026458 filed Jun. 18, 2004.

FIELD

The present embodiments relate generally to a hoisting crane for use with an offshore vessel, for offshore operations.

BACKGROUND

There exists a need for an offshore vessel that has a hoisting crane that has a movable winch support, which is movable relative to a substantially hollow vertical column.

There further exists a need, for an offshore vessel with a hoisting crane that has a movable winch support that maintains a substantially constant orientation between a jib and the winch support.

There further exists a need, for an offshore vessel that has a stinger for supporting a pipeline toward a seabed.

Yet an additional need exists, for an offshore vessel that has a stinger that can act as a counter weight for a hoisting crane during load-lifting operations.

The present embodiments meet these needs.

BRIEF DESCRIPTION OF THE DRAWINGS

The detailed description will be better understood in conjunction with the accompanying drawings.

Figure 1:
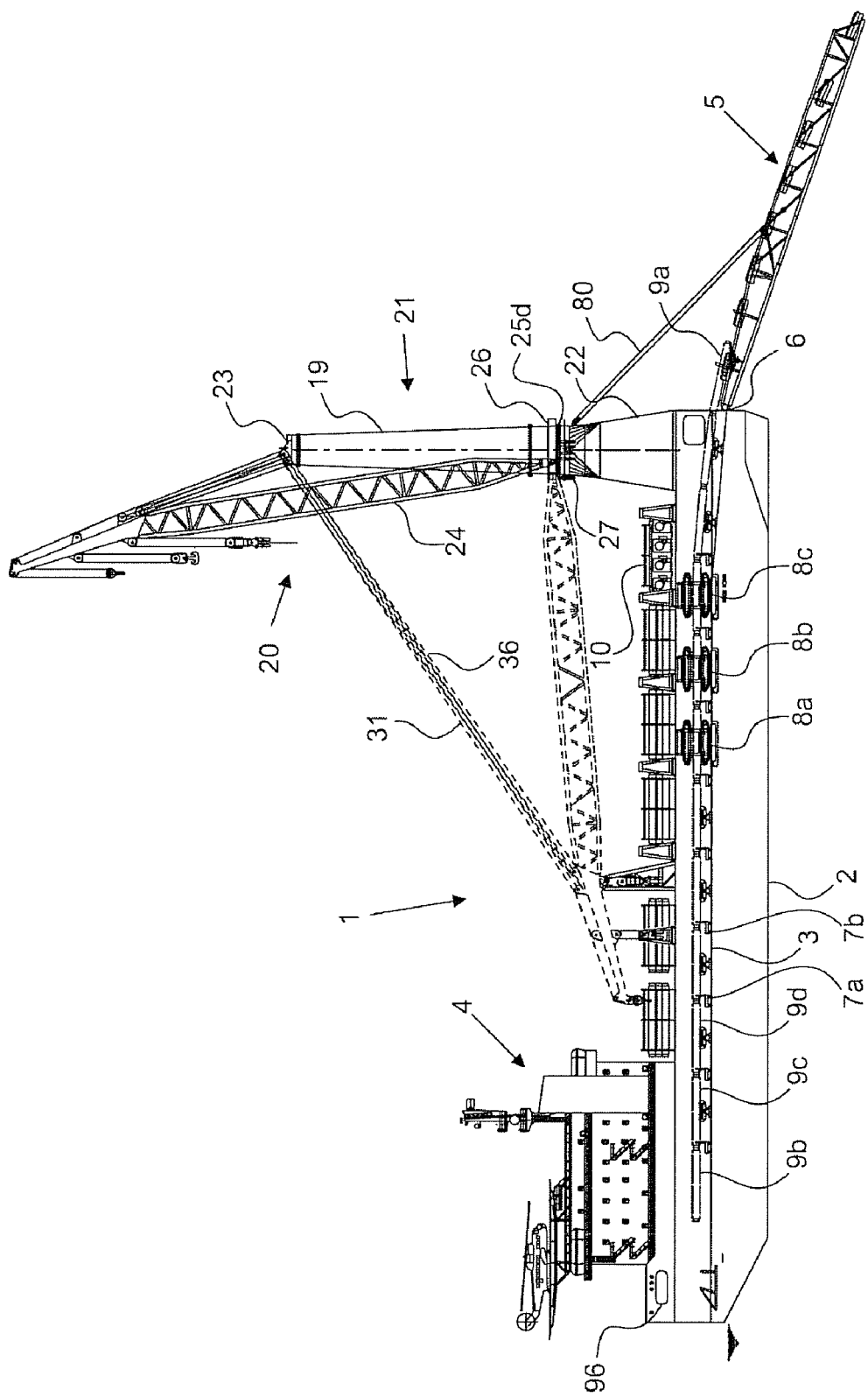
FIG. 1 diagrammatically depicts an offshore vessel which is suitable, inter alia, for laying a pipeline on the seabed.
Figure 2:
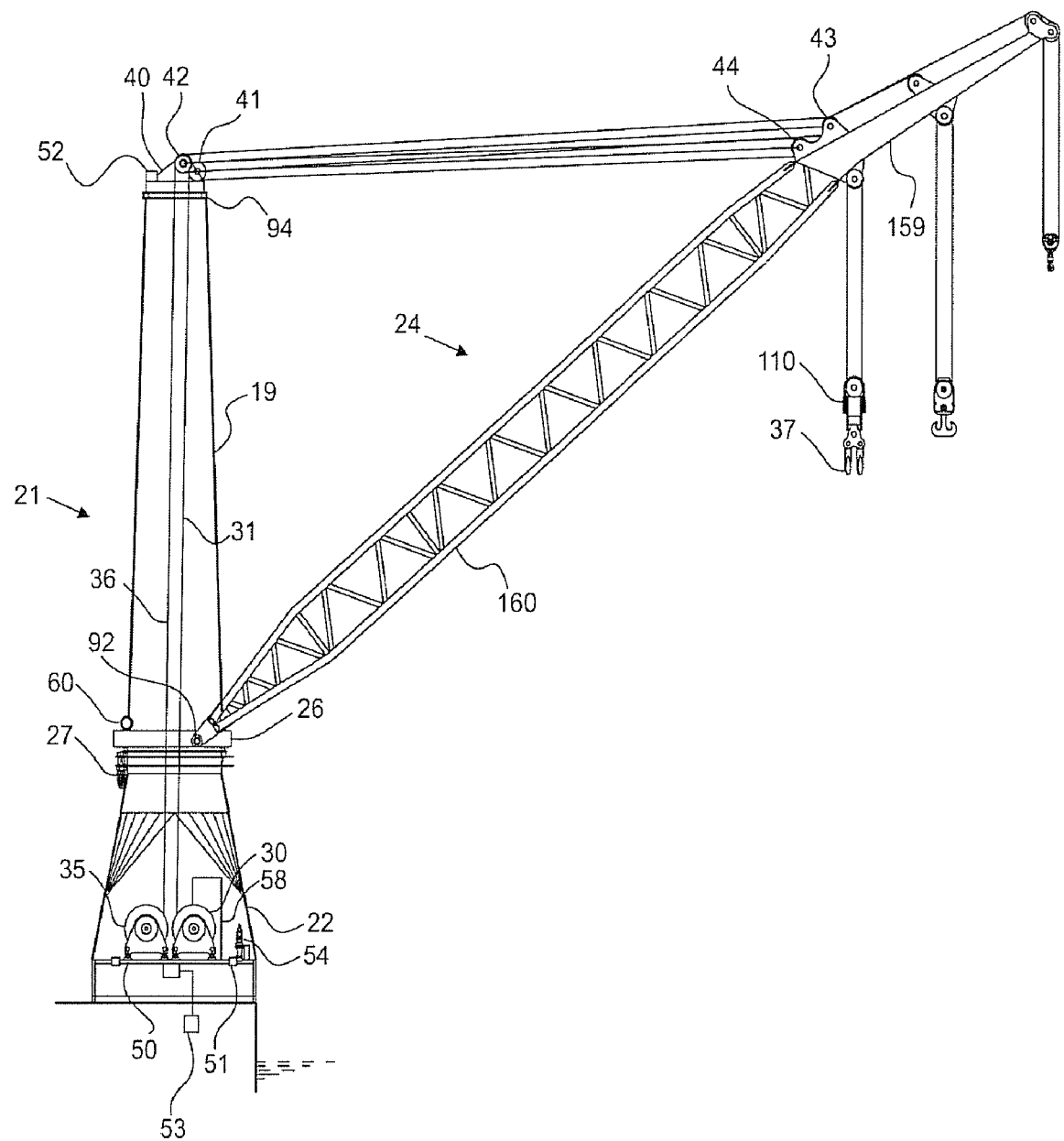
FIG. 2 shows the hoisting crane at the rear side of the vessel shown in FIG. 1, partially in the form of a cut-away view.
Figure 3:
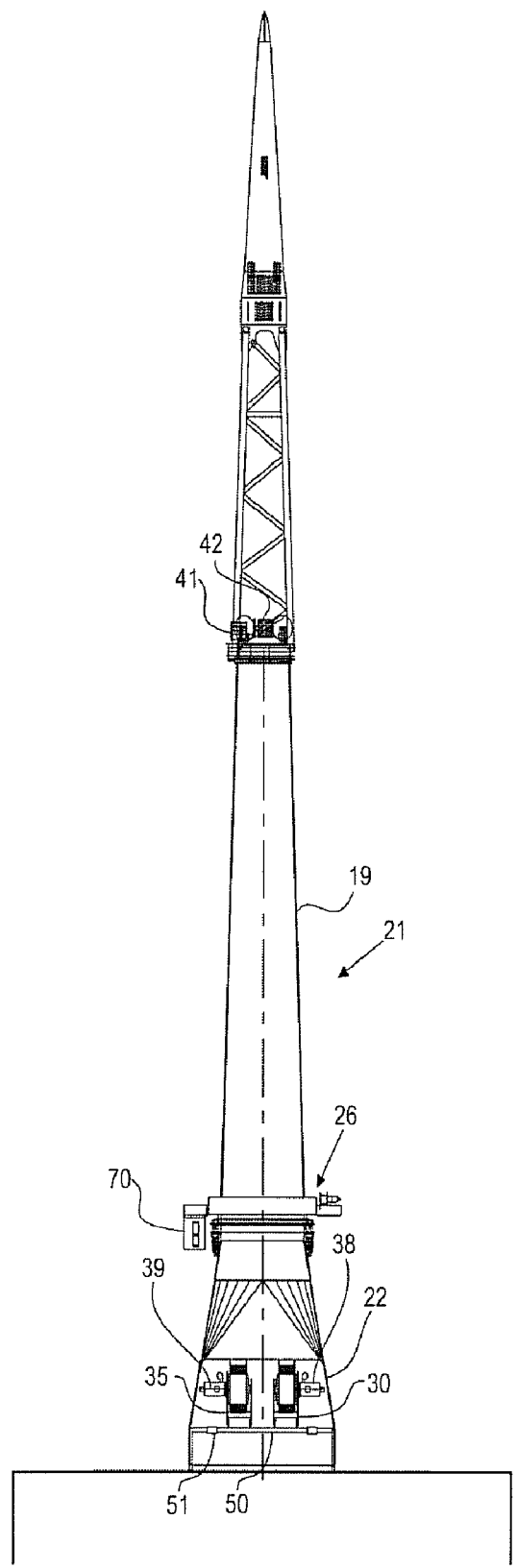
FIG. 3 shows the hoisting crane depicted in FIG. 2 from a different direction.
Figure 4:
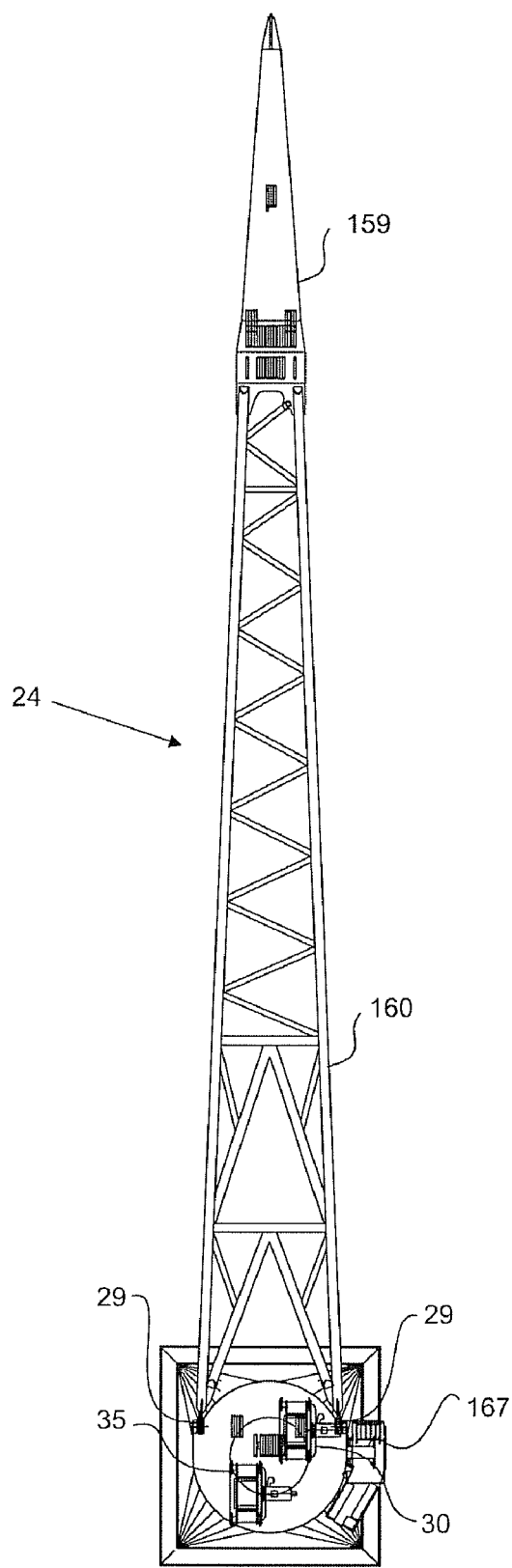
FIG. 4 shows an alternative view of the hoisting crane depicted in FIG. 2.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments of the invention relate generally to an offshore vessel suitable for laying a pipeline on the seabed. The offshore vessel can have a pipeline-laying installation of the S-lay type, with one or more connecting stations disposed on a hull of the offshore vessel, for connecting pipeline sections in a substantially horizontal orientation.

A stinger engages on a first side of the hull at an engagement point, protrudes outside the hull, and forms a downwardly directed support for pipeline moving toward the seabed.

A hoisting crane is disposed on the first side of the hull. The hoisting crane has a substantially hollow vertical column having a foot, a top, and a body disposed between the foot and the top.

A jib is connected to a jib connection member disposed on the substantially hollow vertical column.

The hoisting crane can further have an annular bearing structure, extending around the substantial hollow vertical column, carrying the jib connection member rotatably about the substantially hollow vertical column. The jib connection member forms a substantially horizontal pivot axis allowing the jib to pivot from the foot toward the top and from the top toward the foot.

A top cable guide having a top cable guide annular bearing is disposed on the top of the substantially hollow vertical column. The top cable guide follows rotary movements of the jib about the substantially hollow vertical column and maintains a substantially similar angular position relative to the jib.

A topping winch is disposed on a movable winch support engaging a topping cable for pivoting the jib.

A hoisting winch is disposed on the movable winch support. The hoisting winch can be disposed within the substantially hollow vertical column on the movable winch support.

A hoisting cable is connected to the hoisting winch and is adapted for hoisting a load. The hoisting cable passes through the substantially hollow vertical column to the top cable guide, and then to a hoisting cable guide disposed on the jib.

A second drive motor assembly is connected to the movable winch support for moving the movable winch support to maintain a substantially constant orientation between the movable winch support and the jib during rotary movements of the jib about the substantially hollow vertical column.

A load-bearing connecting structure is secured to the substantially hollow vertical column at an elevated position relative to an engagement point and engages the stinger, for supporting at least a portion of the stinger.

In an embodiment, the hoisting winch can be disposed in the vicinity of the substantially hollow vertical column on the movable winch support.

The load-bearing connecting structure can have an adjustable length for adjusting the position of at least a part of the stinger. The load-bearing connecting structure can further have a connection to a first stinger adjusting cable and a second stinger adjusting cable engaging with a first stinger winch and a second stinger winch, respectively.

In an embodiment, the load-bearing connecting structure can have a telescopic boom secured to the stinger and to the substantially hollow vertical column.

At least one hydraulic jack can be secured to the foot of the substantially hollow vertical column and to the telescopic boom for slidably adjusting the length of the load-bearing structure.

The hoisting crane is adapted to secure to the stinger. The stinger can act as a counter weight during load-lifting operations.

The stinger can be secured to the jib connection member component of the crane.

The hoisting crane can further have an angle sensor. The second drive motor assembly can also have a control means connected to the angle sensor.

In yet another embodiment, the hoisting crane can have a cab for rotating with the jib about the substantially hollow vertical column. The cab can have at least one winch operating member communicating with at least one of the winch drive motor assemblies supported by the annular bearing structure. A control means can be in wireless communication with the at least one winch operating member.

The control means can be disposed on the moveable winch support. At least one wireless transmission unit and at least one wireless reception unit are disposed near the substantially hollow vertical column in or in the vicinity of the moveable winch support.

The substantially hollow vertical column can have a substantially continuous outer wall. Additionally, the substantially hollow vertical column can be conical in shape, narrower at the top and wider at the foot.

The embodiments of the invention can be better understood with reference to the figures.

Referring now to FIG. 1, which shows an offshore vessel 1 which is suitable for laying a pipeline on the seabed. The vessel 1 has a hull 2 with a working deck 3 and a superstructure 4 for crew accommodation, at the front of the hull 2.

The offshore vessel 1 is provided with a pipeline-laying installation of the S-lay type, with one or more connecting stations 7a, 7b on the working deck 3, for coupling pipeline sections 9b, 9c, 9d in a substantially horizontal orientation. On the working deck 3 there are also what are known as tensioners 8a, 8b, 8c for carrying the weight of the pipeline 9a which is hanging downwards from the offshore vessel 1.

The offshore vessel 1 has a stinger 5 which projects outside the hull 2 of the offshore vessel 1 at the rear side of the offshore vessel 1. The stinger 5 engages on the hull 2 by engaging a horizontal pivot structure 6 and forms a downwardly curved support for pipeline 9a.

The offshore vessel 1 has a hoisting crane 20, disposed in the vicinity of the same side of the hull 2 as the stinger 5. The hoisting crane 20 has a substantially hollow vertical column 21 fixed to the hull 2. The hoisting crane 20 will be described in more detail below. Here, the crane 20 is disposed above the location where the pipeline 9a leaves the working deck 3, on the longitudinal axis of the offshore vessel 1.

The hoisting crane 20 has a substantially hollow vertical column 21, which has a foot 22. In this embodiment, the foot 22 is secured to the hull 2. The substantially hollow vertical column 21 further has a body 19 disposed between the foot 22 and a top 23.

The hoisting crane 20 has a jib 24, which is illustrated in two different positions in FIG. 1. An annular bearing structure 25d extends around the substantially hollow vertical column 21 and guides and carries a jib connection member 26, so that the jib connection member 26 and the jib 24 can rotate about the substantially hollow vertical column 21.

The jib connection member 26 forms a substantially horizontal pivot axis 92, enabling the jib 24 to be pivoted from the foot toward the top, and from the top toward the foot. There is at least one drive motor 27 for displacing the jib connection member 26 along the annular bearing structure 25d.

For example, in an embodiment of the hoisting crane, the annular bearing structure 25d has one or more guide tracks which extend around the column 21. The guide tracks support an annular component 28 of the jib connection member 26 by running wheels. Jib securing supports 29 are arranged on the annular component 28 at two positions. The drive motor 27 may, for example, drive a pinion which engages with a toothed track around the substantially hollow vertical column 21.

To pivot the jib 24 up and down, there is a topping winch 30 provided with a first topping cable 31 which engages on the jib 24.

The hoisting crane 20 has a hoisting winch 35 for raising and lowering a load 10, with an associated hoisting cable 36 and a hoisting hook 37. At the top 23 of the substantially hollow vertical column 21, there is a top cable guide 40 provided with a topping cable pulley assembly 41 for the first topping cable 31 and hoisting cable pulley assembly 42 for the hoisting cable 36. The hoisting crane 20 can hoist more than one load.

At least one second hoisting cable pulley assembly 43 for the hoisting cable 36 and a second topping cable pulley assembly 44 for the first topping cable 31 are arranged on the jib 24. The number of cable parts for each cable can be selected as appropriate by one skilled in the art.

The topping winch 30 and the hoisting winch 35 are, in this embodiment, disposed in the foot 22 of the substantially hollow vertical column 21, so that the first topping cable 31 and the hoisting cable 36 extend from the topping winch 30 and hoisting winch 35 upward, through the substantially hollow vertical column 21 to the topping cable pulley assembly 41 and the hoisting cable pulling assembly 42 and then toward the cable pulley assemblies 43, 44 on the jib 24. The jib 24 has a jib top 159 and a jib body 160.

The top cable guide 40 has a top cable guide annular bearing structure 94, which can have one or more running tracks around the top of the substantially hollow vertical column 21 and running wheels. The top cable guide 40 can follow rotary movements of the jib 24 about the substantially hollow vertical column 21 and adopt substantially the same angular position as the jib 24.

The top cable guide 40 can have an associated first drive motor assembly 52 which ensures that the top cable guide 40 follows the rotary movements of the jib 24 about the substantially hollow vertical column 21, but an embodiment without drive motor assembly is possible.

The topping winch 30 and the hoisting winch 35 are arranged on a movable winch support 50, which is mounted movably with respect to the vertical column 21. The movable winch support 50 here is located in the substantially hollow vertical column 21, preferably in the region of the foot 22 under the circular cross section part of the substantially hollow vertical column 21, and is mechanically decoupled from the top cable guide 40. The movable winch support 50 could also be arranged in the hull 2 of the vessel below the substantially hollow vertical column 21. For example, the foot 22 could have an extension which extends into the hull 2.

In the depicted embodiment, the movable winch support 50 is a substantially circular support which at its circumference is mounted in an annular bearing 51, with the topping winch 30 and hoisting winch 35 arranged on the support. The annular bearing 51 is, in this case, arranged such that the support can rotate about a vertical axis which coincides with the axis of rotation of the top cable guide 40. The annular bearing 51 can have any appropriate design including trolleys running along a circular track.

The rotatable movable winch support 50 has an associated second drive motor assembly 54 for moving the movable winch support 50, in such a manner that the movable winch support 50 maintains a substantially constant orientation with respect to the jib 24 in the event of rotary movements of the jib 24 about the substantially hollow vertical column 21. The orientation of the movable winch support 50 with respect to the top cable guide 40 likewise remains substantially constant, since its movements are once again the consequence of rotary movements of the jib 24.

In the embodiment shown, there is an angle sensor 60 for detecting the position of the annular component 28 of the jib connection member 26 with respect to the vertical column 21. The second drive motor assembly 54 of the movable winch support 50 has associated control means 53 which are in operative contact with the angle sensor 60.

The topping winch 30 and hoisting winch 35 each have an associated electrical (or electro-hydraulic) first winch drive motor assembly 38 and a second winch drive motor assembly 39 which are disposed on the movable winch support 50. The electrical energy required is supplied by generators disposed elsewhere on the vessel 1, at a distance from the movable winch support 50. One or more sliding contacts are provided to create the electrical connection between these generators and the first winch drive motor assemblies 38 and the second winch drive motor assembly 39.

In a variant which is not shown, the movable winch support 50 can rotate about a vertical shaft, this shaft being provided with one or more sliding contacts.

One or more sliding contacts are used to feed a power current supply to the electrical equipment on the movable winch support 50.

The hoisting crane 20 is provided with a cab 70 for a hoisting crane operator, the cab 70 is, in this case, carried by the jib connection member 26 to which the jib 24 is secured, so that the cab 70 can rotate with the jib 24 about the substantially hollow vertical column 21.

In the cab 70 there is at least one control member, also referred to as a winch operating member 167, for operating the hoisting winch 35 of the hoisting cable 36 and for operating the topping winch 30 of the first topping cable 31. The first winch drive motor assembly 38 and the second winch drive motor assembly 39 have associated control means 53 which are in wireless communication with the associated control members in the cab 70.

In an embodiment, a plurality of wireless transmission/reception units 168/169 are disposed around the substantially hollow vertical column 21, in or in the vicinity of the path of the cab 70 around the substantially hollow vertical column 21.

The control means 53, depicted as electronic control equipment 58, for the one or more winches on the movable winch support 50 are preferably also positioned on this movable winch support 50.

It can be seen from the figures that, as is preferred, the substantially hollow vertical column 21 has a substantially continuous outer wall. In this case, the horizontal section through the substantially hollow vertical column 21 is substantially circular from the jib connection member 26 to the top 23, with the cross section gradually decreasing towards the top of the substantially hollow vertical column 21.

The foot 22 of the substantially hollow vertical column 21 is substantially rectangular, which has the advantage that the foot 22 can easily be secured (by connecting or using bolts) to the longitudinal and cross bulkheads of the hull 2 of the vessel 1. In a variant which is not shown, the substantially hollow vertical column is partly or completely a framework of bars.

Figure 5:
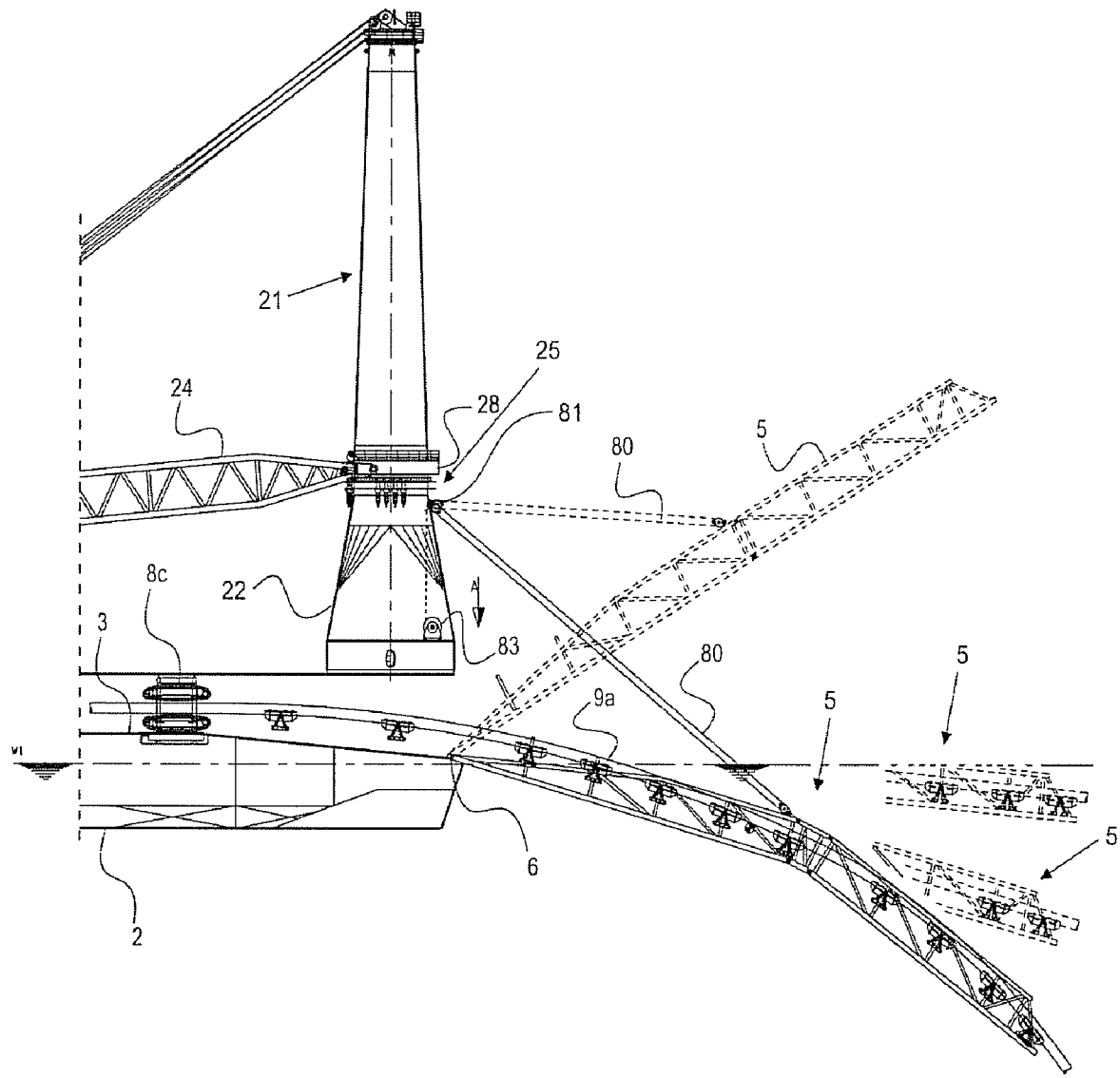
FIG. 5 shows the rear side of the vessel depicted in FIG. 1, with the stinger in various positions.
Figure 6:
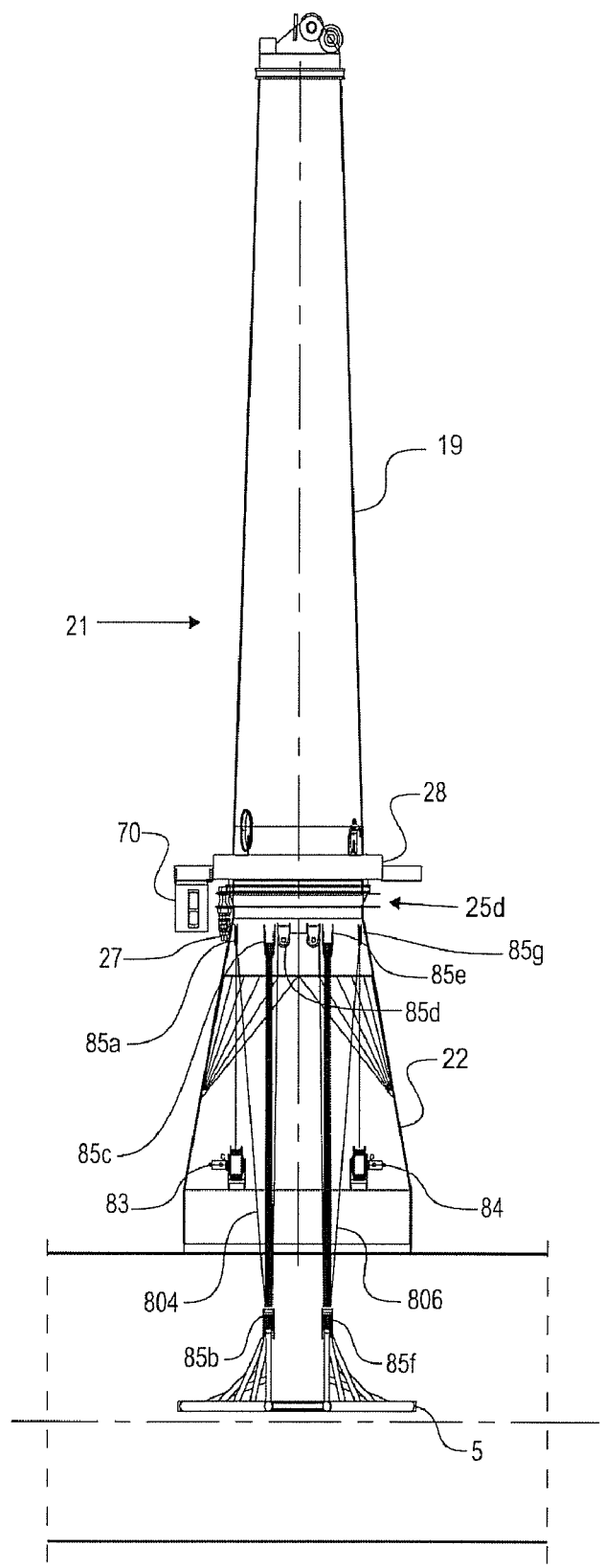
FIG. 6 shows the column of the crane and the stinger depicted in FIG. 5.
Figure 7:
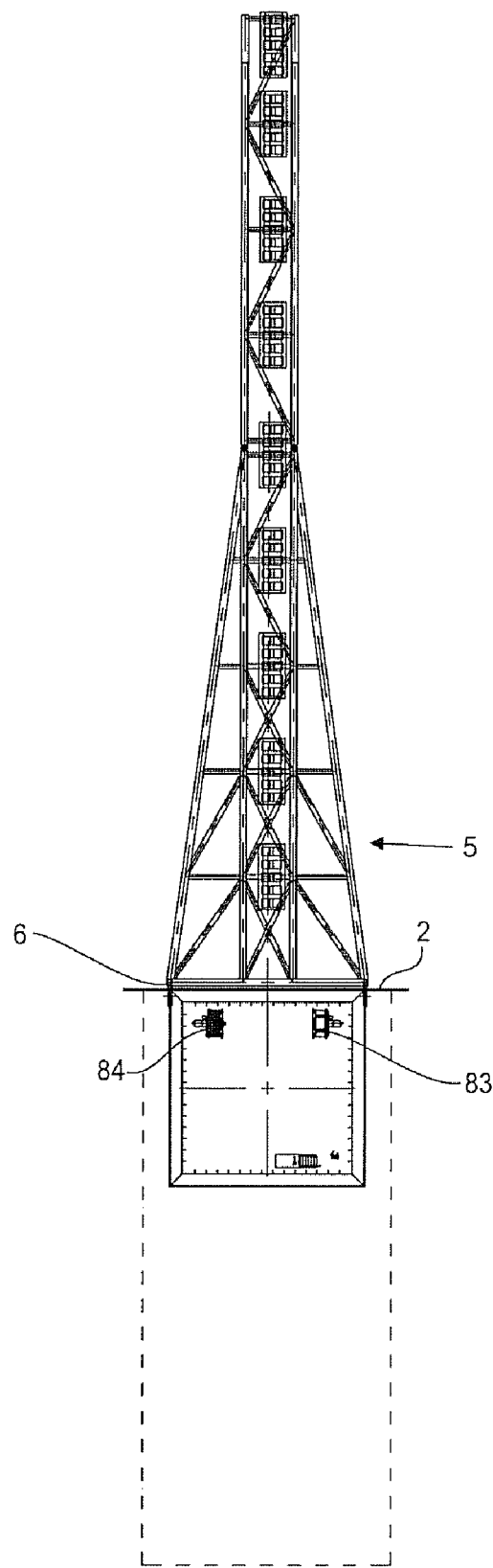
FIG. 7 shows a plan view of the stinger and part of the vessel.

It can be seen from FIG. 1, FIG. 5, and FIG. 6 that a load-bearing connecting structure 80, which holds the stinger 5 in a desired position, extends between the substantially hollow vertical column 21 of the hoisting crane 20 at an elevated position 81 relative to the horizontal pivot structure 6 of the stinger 5 on the vessel hull 2 (in this case in the vicinity of the annular bearing structure for the jib 24), and the stinger 5, at a location remote from the horizontal pivot structure 6 of the stinger on the vessel hull 2.

Using the substantially hollow vertical column 21, here the foot 22, of the hoisting crane 20 as a point of engagement for the load-bearing connecting structure 80 makes it possible to dispense with additional structural components for holding the stinger 5 in place, such as cantilevers projecting outside the hull 2.

This load-bearing connecting structure 80 is, in this case, formed by a cable system 800 with first stinger winch 83, connected to a first stinger adjusting cable 804 and second stinger winch 84 connected to a second stinger adjusting cable 806. The cable system 800 is located in the vicinity of lower end of the foot of the hosting crane 20 and with first stinger cable pulley assembly 85a, second stinger cable pulley assembly 85b, third stinger cable pulley assembly 85c, fourth stinger cable pulley assembly 85d, fifth stinger cable pulley assembly 85e, sixth stinger cable pulley assembly 85f, and seventh stinger cable pulley assembly 85g on the upper end of the foot 22 of the hoisting crane 20 and on the stinger 5. As a result, the length of the load-bearing connecting structure 80 is adjustable for the purpose of adjusting the position of the stinger 5 thereof.

Figure 12:
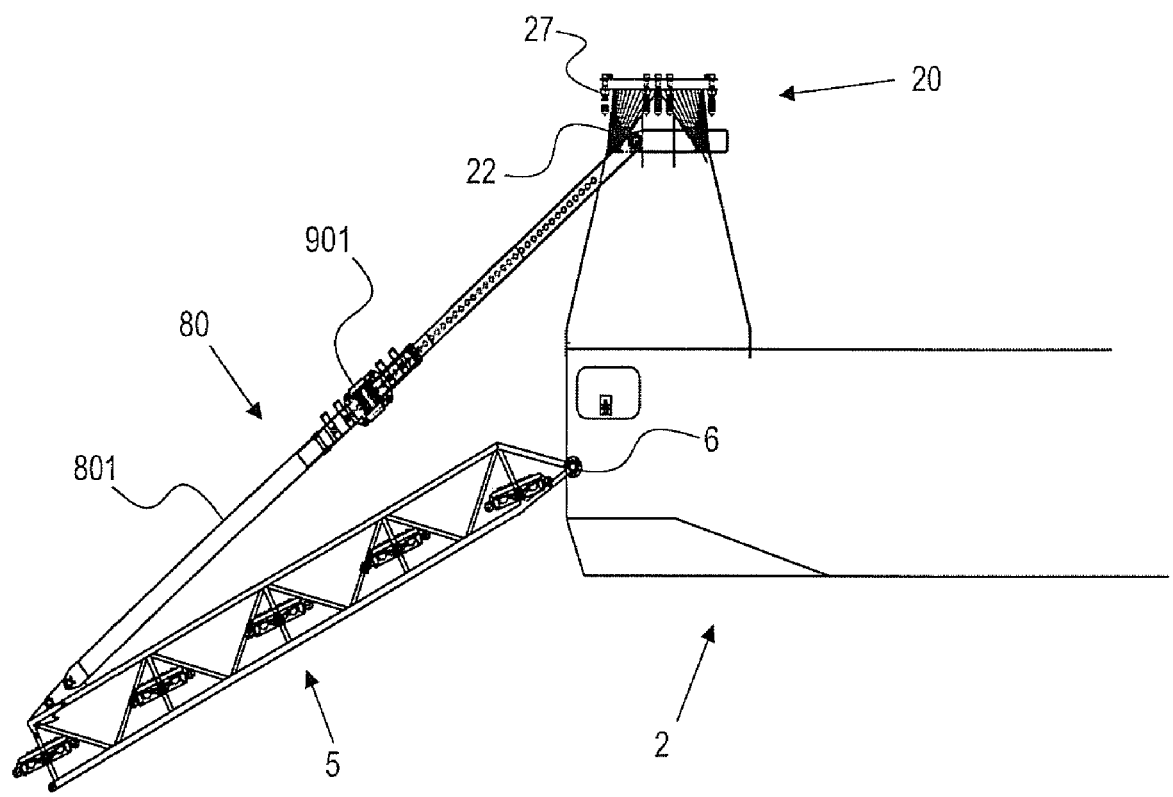
FIG. 12 shows an alternative support structure for the stinger.

Alternatively, a system including adjusters, such as hydraulic adjusters, could be arranged between the substantially hollow vertical column 21 and the stinger 5, e.g. including hydraulic jacks 901. Such a system is shown in FIG. 12, wherein a telescopic boom 801 is arranged between the stinger 5 and the substantially hollow vertical column 21, in this example the upper end of the foot. At least one hydraulic jack 901 can be provided to slide the telescopic boom 801 in and out.

The vessel 1 can be used to lay a pipeline 9a, but also for hoisting work, such as the hoisting work carried out, for example, in the offshore industry when installing supports, underwater installations.

Figure 13:
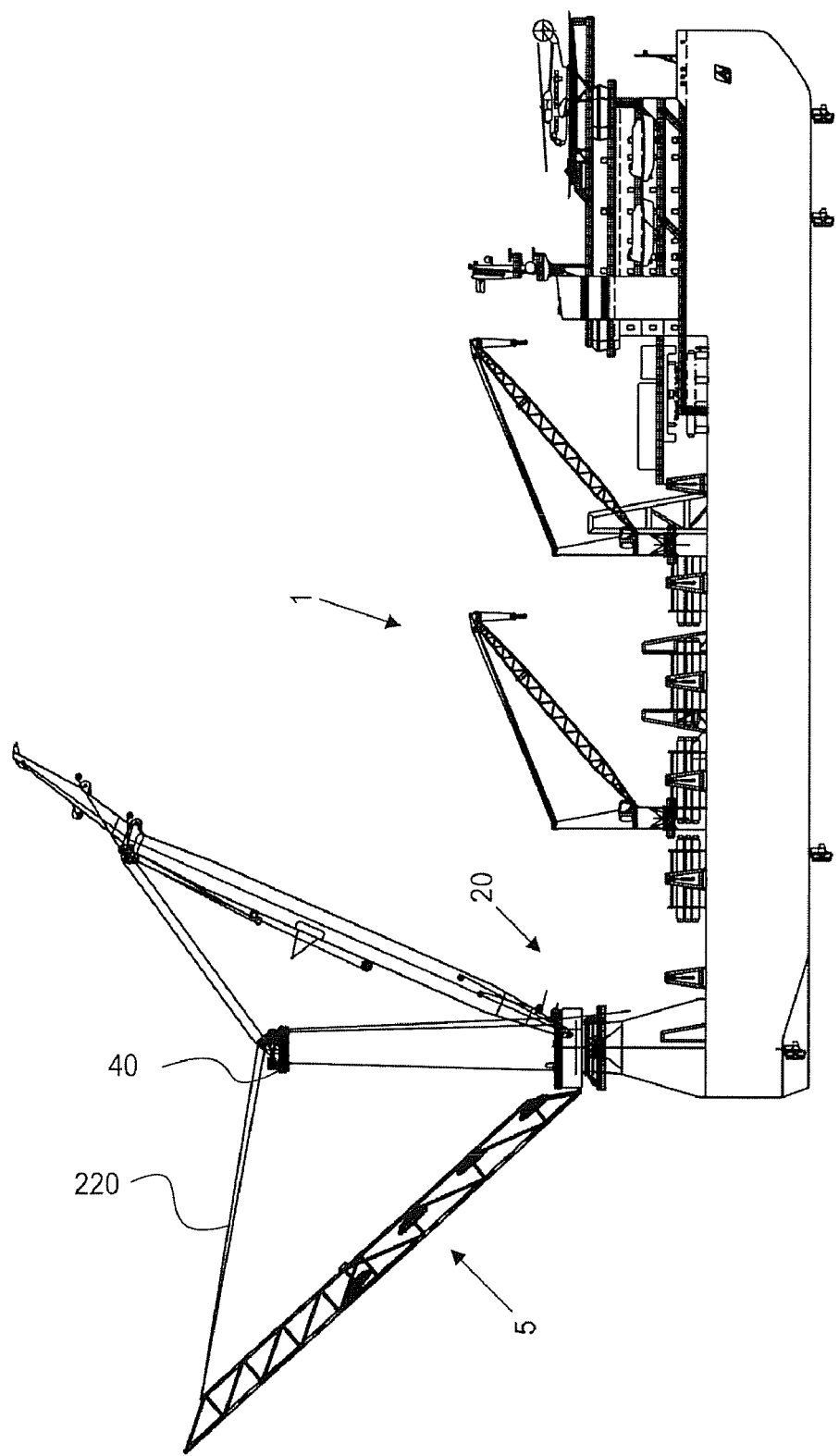
FIG. 13 shows the use of the stinger as counterweight in a lifting operation.

In an embodiment depicted in FIG. 13, it is contemplated that the stinger 5 of the vessel 1 is employed as a counterweight in a lifting operation using hosting crane 20. For this purpose the stinger 5 could be connected also to the jib connection member 26 of the hosting crane 20.

In this example, a second topping cable 220 is arranged between the stinger 5 and the top cable guide 40 of the hosting crane 20. It is noted that this method could be employed on other types of S-lay pipelaying vessels which have a hosting crane 20 and a stinger 5. It can also be envisaged that a further weight, such as a barge, is suspended from the stinger 5 to effectively increase the counterweight.

In one embodiment of the hoisting crane 20, at least one winch can be used, such as hoisting winch 36, however, an alternative embodiment of the hoisting crane 20 can relate to an even reeving system. The even reeving system has a first hoisting winch 62 and a second hoisting winch 64.

Figure 8:
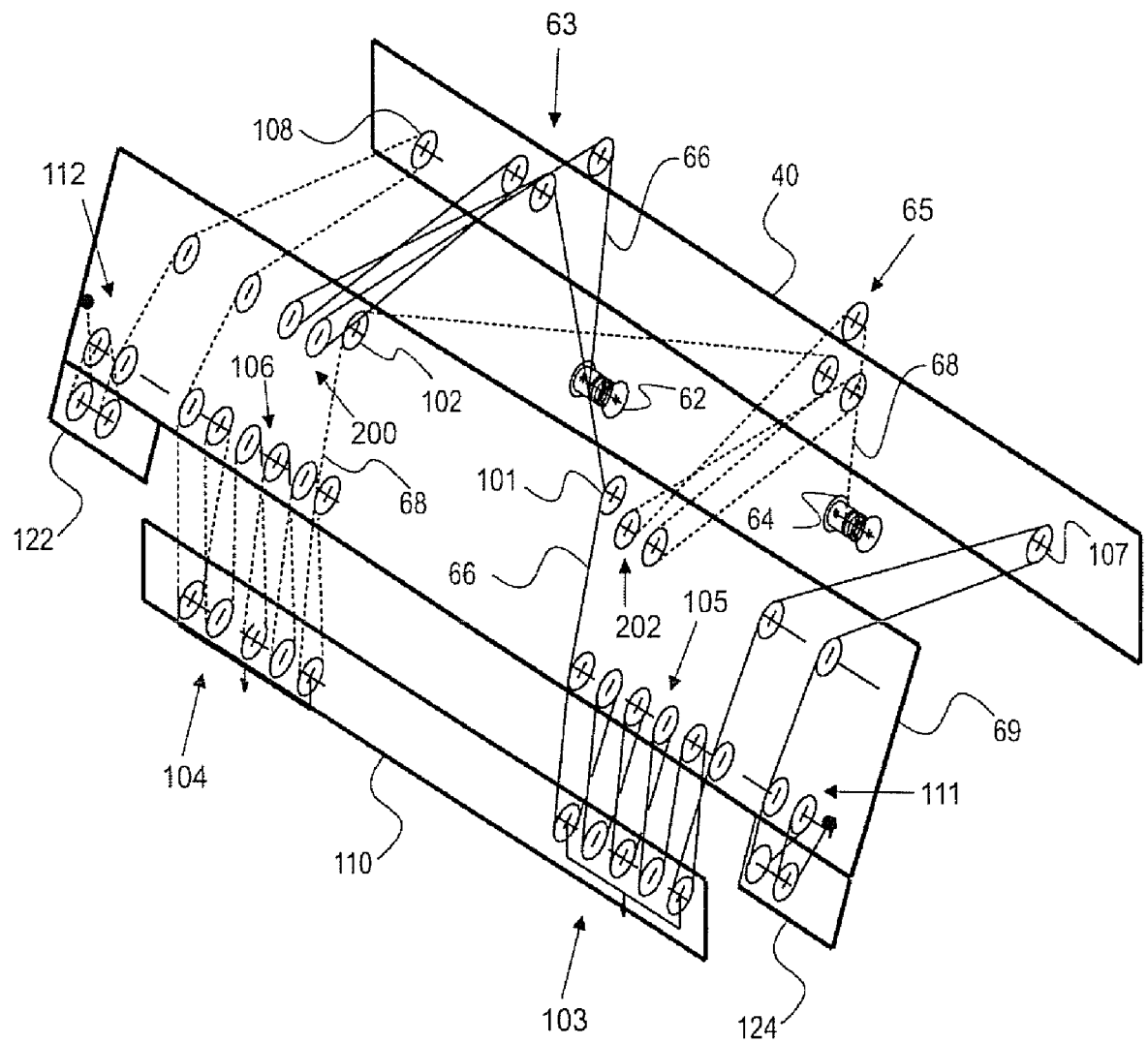
FIG. 8 depicts a possible layout of hoisting cables of the crane.

In FIG. 8 a preferred layout of the hoisting cables of the hosting crane 20 is shown.

In this preferred crane a first hoisting winch 62 and a second hoisting winch 64, preferably both arranged on a movable winch support 50 as explained above, are employed for hoisting a load suspended from hoisting hook 37 which includes crane hook block 110.

A first hoisting cable 66 (here shown in solid line) is associated with the first hoisting winch 62 and a second hoisting cable 68 (here shown in dashed line) is associated with the second hoisting winch 64.

The first hoisting cable 66 and the second hoisting cable 68 extend from the first hoisting winch 62 and the second hoisting winch 64 upward though the foot 22 and the hollow vertical column 21 and then arrive at top cable guide 40 of the hosting crane 20. In this drawing, the top cable guide 40 is schematically depicted.

The top cable guide 40 has a left side provided with a first hoisting cable pulley assembly 63 for the first hoisting cable 66 and a right side provided with a second hoisting cable pulley assembly 65 for the second hoisting cable 68.

FIG. 8 further schematically depicts the hoisting cable guide 69 on the jib 24 of the hoisting crane 20. The hosting cable guide 69 has a left side provided with a third hoisting cable pulley assembly 200 for the first hoisting cable 66 and a right side provided with a fourth hoisting cable pulley assembly 202 for the second hoisting cable 68.

The first hoisting cable 66 extends between the first hoisting cable pulley assembly 63 and third hoisting cable pulley assembly 200, the first hoisting cable pulley assembly 63 and the third hoisting cable pulley assembly 200 having three and two pulleys, respectively in this example.

The second hoisting cable 68 extends between the second hoisting cable pulley assembly 65 and the fourth hoisting cable pulley assembly 202, the second hosting cable pulley assembly 65 and the fourth hoisting cable pulley assembly 202 having three and two pulleys, respectively in this example.

From the innermost pulley of first hoisting cable pulley assembly 63, the first hoisting cable 66 then extends diagonally to a first hoisting cable pulley 101, mounted on the right side of the hoisting cable guide 69 on the jib 24.

From the innermost pulley of the second hoisting cable pulley assembly 65, the second hoisting cable 68 extends diagonally to a second hoisting cable pulley 102 mounted on the left side of the hoisting cable guide 69 on the jib 24.

The first hoisting cable 66 and second hoisting cable 68 then each extend from the first and second hoisting cable pulley 101, 102 of the hosting cable guide 69 on the jib 24 to a first hoisting cable crane hook pulley assembly 103 and a second hoisting cable crane hook pulley assembly 104 on the right and left side of a crane hook block 110, respectively.

The first hoisting cable crane hook pulley assembly 103 and the second hosting cable crane hook pulley assembly 104 are associated with a first jib pulley assembly 105 and a second jib pulley assembly 106 mounted on the jib 24, such that the first and second hoisting cables 66, 68 extend in a multiple fall arrangement between the first hoisting cable crane hook pulley assembly 103 and the first jib pulley assembly 105 and between second hoisting cable crane hook pulley assembly 104 and second jib pulley assembly 106. The first and second hoisting cables 66, 68 each further extend between the associated first jib pulley assembly 105 and the second jib pulley assembly 106 and the right side and left side of the top cable guide 40, respectively.

A first hoisting cable pulley 107 is mounted on the right side of the top cable guide 40 and a second hoisting cable pulley 108 is mounted on the left side of the top cable guide 40. The hoisting cables each extend around the pulley 107, 108 and then return to the jib top 159, where the first and second hoisting cables 66, 68 each have a terminal end at the right side and left side of the jib 24 respectively.

In the example shown, the crane hook block 110 includes additional cable pulley assemblies, fourth cable pulley assembly 122 and fifth cable pulley assembly 124, which can be connected to the crane hook block 110 when desired or be held against the jib 24 (see FIG. 8). The fourth cable pulley assembly 122, fifth cable pulley assembly 124, first associated cable pulley assembly 111, and second associated cable pulley assembly 112 are mounted on the jib 24.

The layout of the hoisting cables shown in FIG. 8 is in particular advantageous for high capacity cranes, more importantly when the top cable guide 40 is arranged in a freely rotatable manner, wherein the top cable guide 40 follows the motions of the jib 24 around the substantially hollow vertical column 21. In case of a failure of one of the first hoisting winch 62 and second hoisting winch 64, the layout shown here causes the top cable guide 40 to maintain its position, which is highly desirable.

A further advantage of the layout shown here is that the first hoisting winch 62 and second hoisting winch 64 can assist in the topping of the jib 24, which allows for a reduction of the capacity of the topping winch 30.

Figure 9:
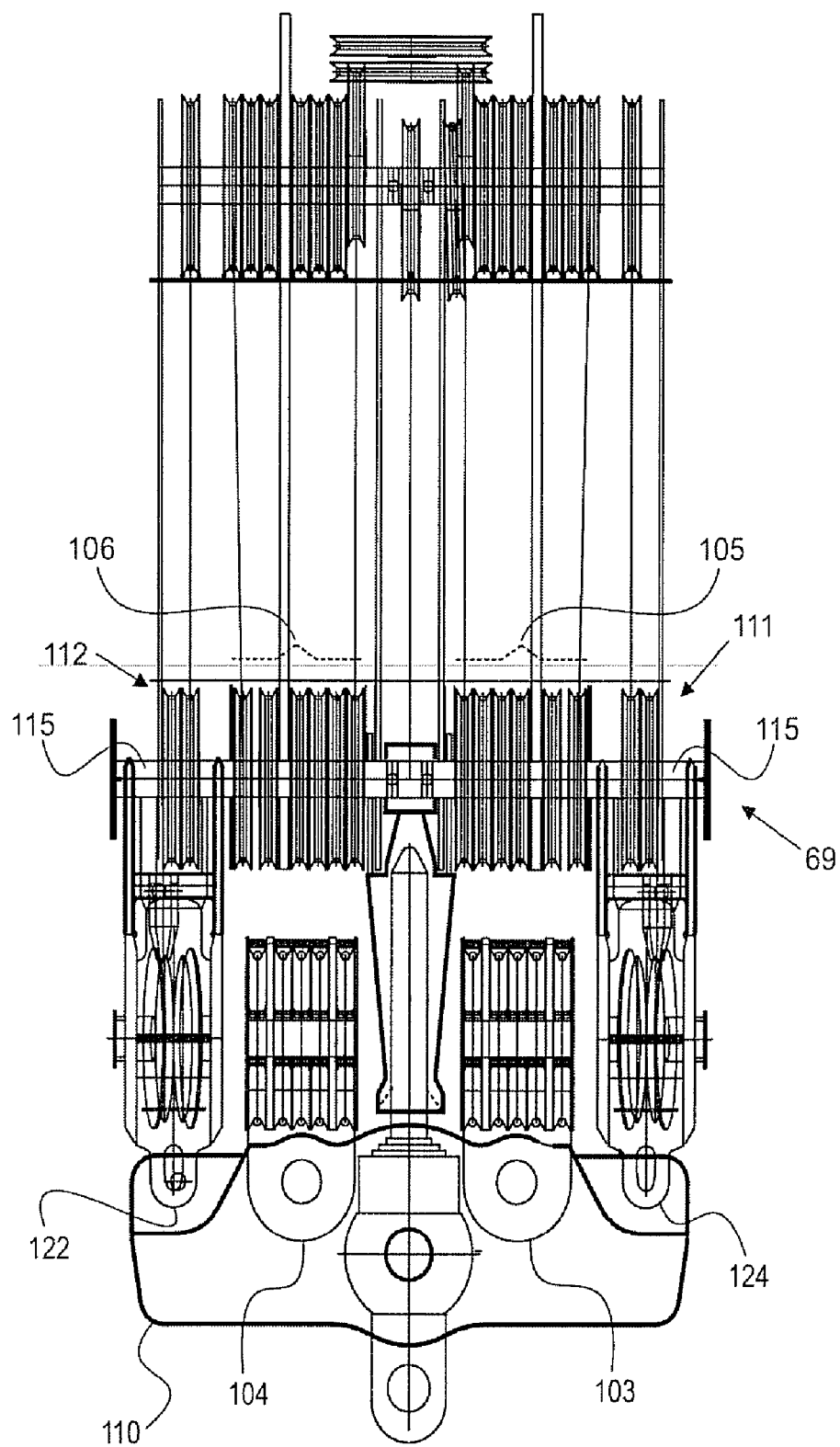
FIG. 9 depicts an embodiment of a crane block, jib, and block catcher device.

In FIG. 9 the crane hook block 110 is shown, and also the first hoisting cable crane hook pulley assembly 103 and the second hoisting cable crane hook pulley assembly 104 mounted on the crane hook block 110, each having multiple pulleys arranged adjacent each other. Also the fourth cable pulley assembly 122 and the fifth cable pulley assembly 124 are shown here, releasably attached to the crane hook block 110 at the outer ends thereof. Also visible is the hoisting cable guide 69, including numerous cable pulleys, including the first jib pulley assembly 105, the second jib pulley assembly 106, the first associated cable pulley assembly 111, and the second associated cable pulley assembly 112, in this example. It is shown that the pulleys of the hoisting cable guide 69 are mounted here on aligned shafts 115.

The crane hook block 110 is in this example intended for extreme loads and the total weight of the crane hook block 110 including the crane hook (not depicted here) could be tens of tons, up to 100 tons.

Figure 10:
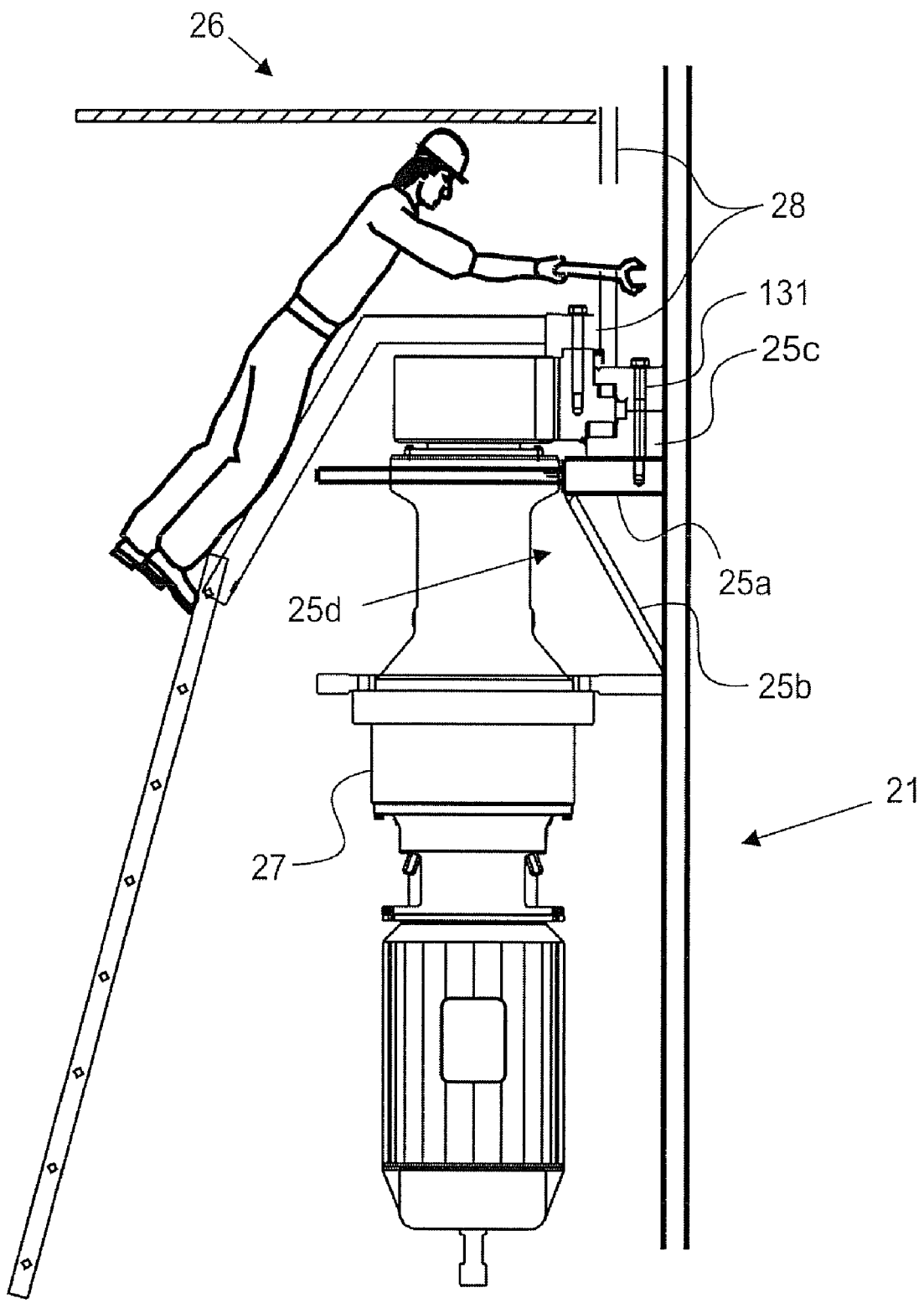
FIG. 10 shows an embodiment of the annular bearing assembly of the crane.

FIG. 10 shows a preferred embodiment of the annular bearing stricture 25*d* for the annular component 28 which supports the jib 24. Around the substantially hollow vertical column 21 of the hosting crane 20, a radial support flange 25*a* is fitted. Beneath flange 25*a* a support cone 25*b* is fitted.

On top of the support flange 25*a* a guide track structure 25*c* is mounted, which provides a running surface for rollers mounted on the annular component 28. In this example, the track structure 25*c* includes a bottom part and an upper part interconnected via bolts 131. These bolts are readily accessible for fastening as shown in FIG. 10.

It is noted that the annular bearing structure 25*d* of the triangular cross section can also be used on any type of crane, such as a mast crane without rotatable movable winch support 50.

Figure 11:
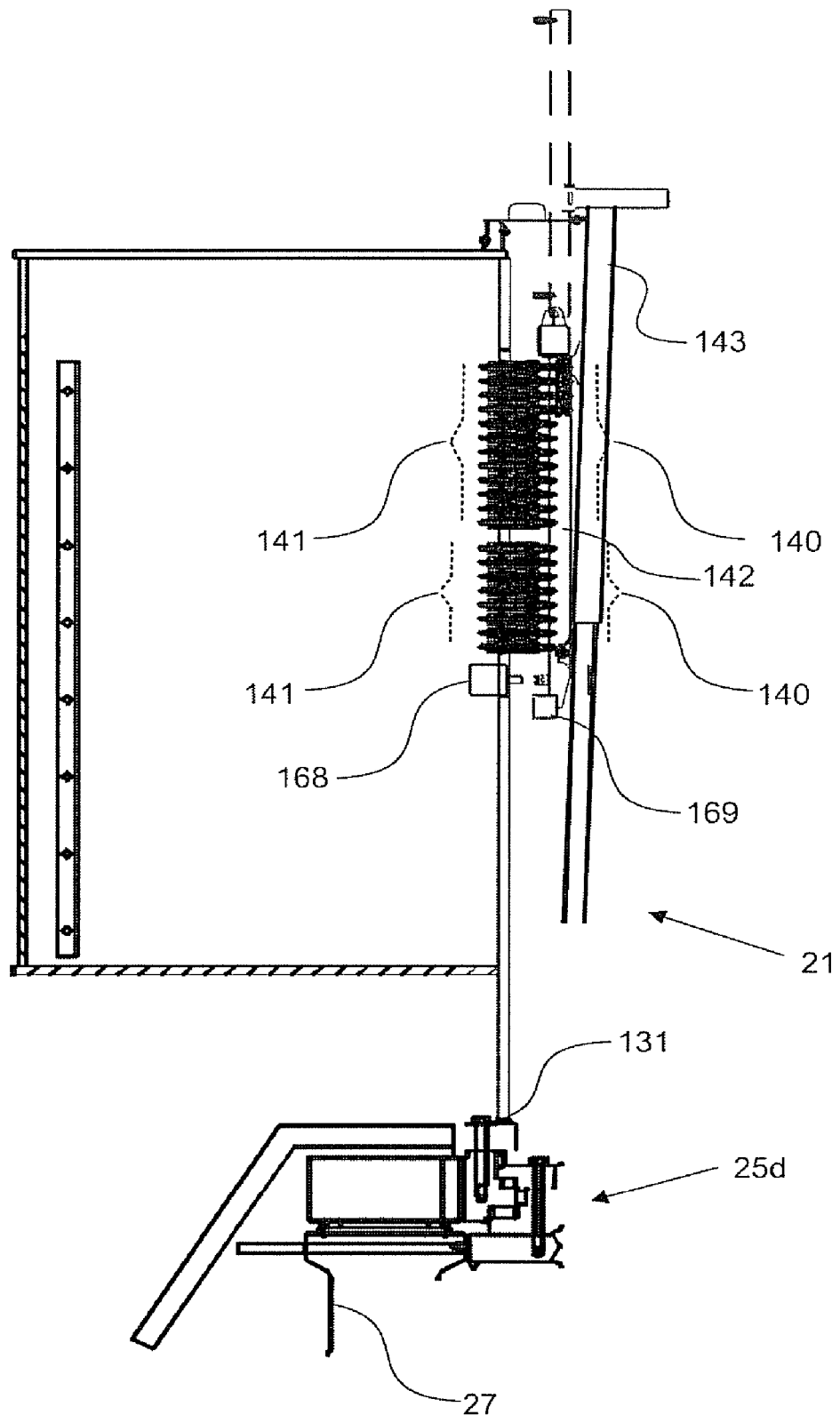
FIG. 11 shows a preferred embodiment of electrical contact rings of the crane.

FIG. 11 depicts schematically a preferred embodiment of the provision of electrical power to electrical equipment mounted rotatably on the substantially hollow vertical column 21, e.g. in the cab 70. For this purpose, a set of electrically conductive contact rings 140 are mounted around the substantially hollow vertical column 21, here above the annular bearing structure 25*d*. Electrically conductive contact sliders 141 are mounted to move along the electrically conductive contact rings 140 and provide electrical contact. In order to access the electrically conductive contact rings, such as for repair, the set of electrically conductive contact rings 140 is arranged movable in vertical direction to a raised access position as shown in dashed lines in FIG. 11. For this purpose, the electrically conductive contact rings 140 are mounted on a common frame 142, which is slidable with respect to associated guides 143 placed along the substantially hollow vertical column 21. One or more actuators, such as vertically arranged screw spindles or hydraulic jacks, could be provided to raise the frame 142 with the rings. One or more of the rings could serve to transmit signals instead of electrical power, e.g. of the open-coax type.

While these embodiments have been described with emphasis on the embodiments, it should be understood that within the scope of the appended claims, the embodiments might be practiced other than as specifically described herein.

What is claimed is:

1. An offshore vessel (1), suitable for laying a pipeline on the seabed, comprising:
   a. a hull (2) with a working deck (3);
   b. a pipeline-laying installation of the S-lay type, with one or more connecting stations on the working deck (3) for connecting pipe sections in a substantially horizontal orientation;
   c. a stinger (5), which projects outside the hull (2) of the vessel, engages on the hull at a horizontal pivot structure and forms a downwardly directed support for pipeline (9) moving towards the seabed,
   d. a hoisting crane (20), disposed in the vicinity of the same side of the hull as the stinger (5), wherein the hoisting crane has a vertical structure (21), wherein the vertical structure (21) comprises a foot (22), wherein the foot (22) is statically fixed to the hull above and vertically aligned with the location where the pipeline (9) leaves the working deck (3) and in that a load-bearing connecting structure (80), which holds the stinger or part of it in a desired position, extends between the vertical structure of the hoisting crane, at a position higher than the point of engagement of the stinger on the vessel hull, and the stinger, at a location remote from the point of engagement of the stinger on the vessel hull.

2. The offshore vessel according to claim 1, in which the load-bearing connecting structure (80) has an adjustable length for adjusting the position of the stinger or part of it.

3. The offshore vessel according to claim 2, in which the connecting structure (80) comprises a cable with an associated winch.

4. The offshore vessel according to claim 1, in which the connecting stations are provided on a working deck and in which the crane is elevated above and perpendicular to the location where the pipeline leaves the working deck, on the longitudinal axis of the vessel.

5. The offshore vessel according to claim 1, wherein the hoisting crane comprises a jib connected to a jib connection member disposed on the vertical structure and an annular bearing structure extending around the vertical structure, for guiding and carrying the jib connection member rotatably about the vertical structure, and wherein the load-bearing connecting structure (80), extends between the vertical structure of the hoisting crane, at a position in the vicinity of the annular bearing structure for the jib, and the stinger, at a location remote from the point of engagement of the stinger on the vessel hull.

6. The offshore vessel according to claim 1, in which the crane comprises a foot and the load-bearing connecting structure (80) is formed by a cable system with winches in the vicinity of the lower end of the foot of the crane and with cable pulley assemblies on the upper end of the foot of the crane and on the stinger.

7. The offshore vessel according to claim 1, in which hydraulic adjusters are arranged between the crane column and the stinger (5).

* * * * *